United States Patent
Choi et al.

(10) Patent No.: US 7,959,383 B2
(45) Date of Patent: Jun. 14, 2011

(54) CUTTING INSERT AND CUTTING TOOL THEREWITH

(75) Inventors: Chang Hee Choi, Daegu (KR); Chang Gyu Park, Daegu (KR)

(73) Assignee: Taegutec Ltd., Dalseong-gun (KR)

( * ) Notice: Subject to any disclaimer, the term of this patent is extended or adjusted under 35 U.S.C. 154(b) by 204 days.

(21) Appl. No.: 12/440,078

(22) PCT Filed: Sep. 6, 2006

(86) PCT No.: PCT/KR2006/003543
§ 371 (c)(1),
(2), (4) Date: Mar. 5, 2009

(87) PCT Pub. No.: WO2008/029964
PCT Pub. Date: Mar. 13, 2008

(65) Prior Publication Data
US 2010/0183381 A1    Jul. 22, 2010

(51) Int. Cl.
*B23C 5/22* (2006.01)
*B23C 5/20* (2006.01)
(52) U.S. Cl. ........................ 407/105; 407/104
(58) Field of Classification Search ............... 407/48, 407/103, 104, 113–116
See application file for complete search history.

(56) References Cited

U.S. PATENT DOCUMENTS

| | | | | |
|---|---|---|---|---|
| 3,320,654 A | * | 5/1967 | Lovendahl | 407/104 |
| 3,341,919 A | * | 9/1967 | Lovendahl | 407/104 |
| 3,708,843 A | * | 1/1973 | Erkfritz | 407/38 |
| 3,740,807 A | * | 6/1973 | Getts | 407/104 |
| 3,913,197 A | * | 10/1975 | Wolf | 407/47 |
| 5,199,828 A | * | 4/1993 | Forsberg et al. | 407/104 |
| 5,938,377 A | * | 8/1999 | Jordberg et al. | 407/104 |
| 7,144,205 B2 | * | 12/2006 | Sheffler et al. | 407/103 |
| 2004/0223819 A1 | | 11/2004 | Sheffler et al. | |
| 2006/0198707 A1 | | 9/2006 | Sheffler et al. | |
| 2008/0193233 A1 | | 8/2008 | Park | |

FOREIGN PATENT DOCUMENTS

| | | |
|---|---|---|
| KR | 10-2002-28817 | 4/2002 |
| WO | 03 022495 | 3/2003 |
| WO | 2006 054824 | 5/2006 |

OTHER PUBLICATIONS

U.S. Appl. No. 12/094,410, filed May 21, 2008, Choi, et al.
Office Action issued on Jan. 18, 2011 in Korean Patent Application No. 10-2009-7004615 (4 pages).

* cited by examiner

*Primary Examiner* — Will Fridie, Jr.
(74) *Attorney, Agent, or Firm* — Oblon, Spivak, McClelland, Maier & Neustadt, L.L.P.

(57) ABSTRACT

The present invention provides a cutting insert and a cutting tool used with the same. A tool body includes at least one seating surface and a threaded hole extending as slanted with respect to the seating surface. At least one cutting insert having a mounting hole passing therethrough is removably secured on the seating surface. A screw passes through the mounting hole and is fastened to the threaded hole, thereby removably securing the cutting insert to the tool body. A wall surface of the mounting hole contacts a head of the screw about at least one first contact portion and at least one second contact portion. The first contact portion is formed at a level different from that of the second contact portion along a longitudinal axis of the mounting hole. Contact angles at the first contact portions and the second contact portions are different from each other.

11 Claims, 3 Drawing Sheets

CUTTING INSERT AND CUTTING TOOL THEREWITH

TECHNICAL FIELD

The present invention generally relates to a cutting insert and a cutting tool comprising the same.

BACKGROUND ART

Cutting inserts, which provide cutting edges of a cutting tool, are made from a material with high abrasion resistance such as tungsten carbide. Such cutting inserts are rigidly secured to a tool body by means of screws so that they can perform stable cutting during a cutting process. FIG. 1 is a perspective view of a milling cutter, to which a prior art cutting insert is applied. A screw is perpendicularly fastened to a cutting insert seating surface of a cutter body, wherein a bottom surface of the cutting insert is brought into contact, thereby securing the cutting insert to the cutter body. In such a case, since the screw exerts only a perpendicular fastening force to the cutting insert, the screw fails to sufficiently support the reaction force corresponding to a cutting force and can be unfastened during operation of the milling cutter. Accordingly, there is a problem in that the cutting insert is not rigidly secured to the cutter body.

FIG. 2 is a perspective view of another prior art milling cutter, wherein a screw-fastening structure is modified in order to solve the above-mentioned problem. In this structure, a screw is fastened to a cutting insert seating surface of a cutter body and is slanted at a predetermined angle. With the slantingly fastened screw, the fastening force of the screw is allowed to have both perpendicular and horizontal components. Thus, the screw can be maintained as fastened, despite the reaction force corresponding to the cutting force, and the cutting insert can be more stably secured to the cutter body. However, even with such screw-fastening structure, there is a problem in that when subjected to a cutting environment accompanied by heavier vibrations, the screw cannot withstand such an environment and thus becomes unfastened.

DISCLOSURE OF INVENTION

Technical Problem

The present invention is directed to solving the foregoing problems of the prior art. It is an object of the present invention to provide a structure, wherein a screw for securing a cutting insert to a tool body is not unfastened under a working environment accompanied by heavier vibrations. Thus, the cutting insert can be maintained as rigidly secured to the tool body.

It is a further object of the present invention to provide a cutting insert, which has a screw-contact structure allowing an unclamping force of the already fastened screw to be greatly increased, and a cutting tool comprising such a cutting insert.

Technical Solution

In order to achieve the above objects, a cutting tool, which is constructed in accordance with the present invention, comprises the following: a tool body including at least one seating surface and a threaded hole extending in a direction away from the seating surface; at least one cutting insert removably secured on the seating surface, the at least one cutting insert having a mounting hole passing therethrough; and a screw passing through the mounting hole and being fastened to the threaded hole, thereby removably securing the cutting insert to the tool body. The threaded hole is slanted with respect to the seating surface. A wall surface of the mounting hole contacts a head of the screw about at least one first contact portion and at least one second contact portion. The at least one first contact portion is formed at a level different from that of the at least one second contact portion along a longitudinal axis of the mounting hole. A contact angle at the first contact portions and a contact angle at the second contact portions are different from each other.

According to one embodiment of the present invention, the first contact portions provide a contact angle of approximately 60 degrees and the second contact portions provide a contact angle of less than 60 degrees, preferably approximately 40 degrees. Further, the first contact portions may be disposed lower than the second contact portions along the longitudinal axis of the mounting hole.

According to one embodiment of the present invention, the wall surface of the mounting hole further contacts the head of the screw about at least one third contact portion. The at least one first contact portion, the at least one second contact portion and the at least one third contact portion form a continuous contact line around the periphery of the head of the screw.

According to one embodiment of the present invention, the mounting hole is symmetrical with respect to its center portion. Further, the cutting insert has a rectangular parallel piped shape and the mounting hole is round at the upper and lower ends and rectangular with rounded corners in the middle portion.

DESCRIPTION OF LEGEND IN THE DRAWINGS

Figure 1:
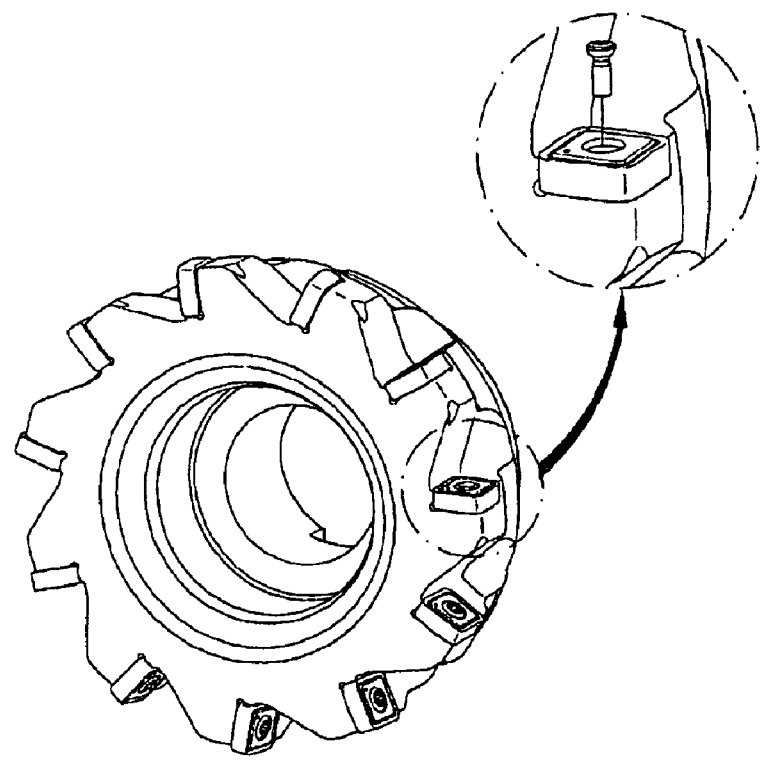
FIG. 1 is a perspective view of a prior art milling cutter with a cutting insert.
Figure 2:
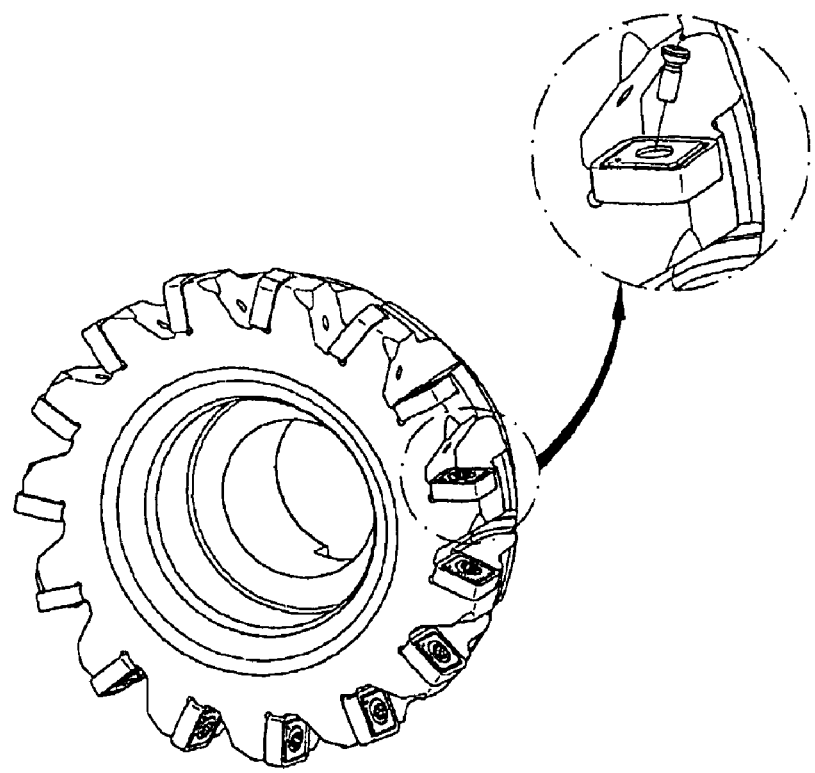
FIG. 2 is a perspective view of another prior art milling cutter with a screw-fastening structure modified.

10: cutting insert
12: corner
14: mounting hole
16: wall surface of a mounting hole
18: lateral portion
22, 24: contact lines
30: screw
32: head of a screw
34: thread of a screw
40: tool body
42: threaded hole
44: thread of a hole
46: seating surface

BEST MODE FOR CARRYING OUT THE INVENTION

Figure 3:
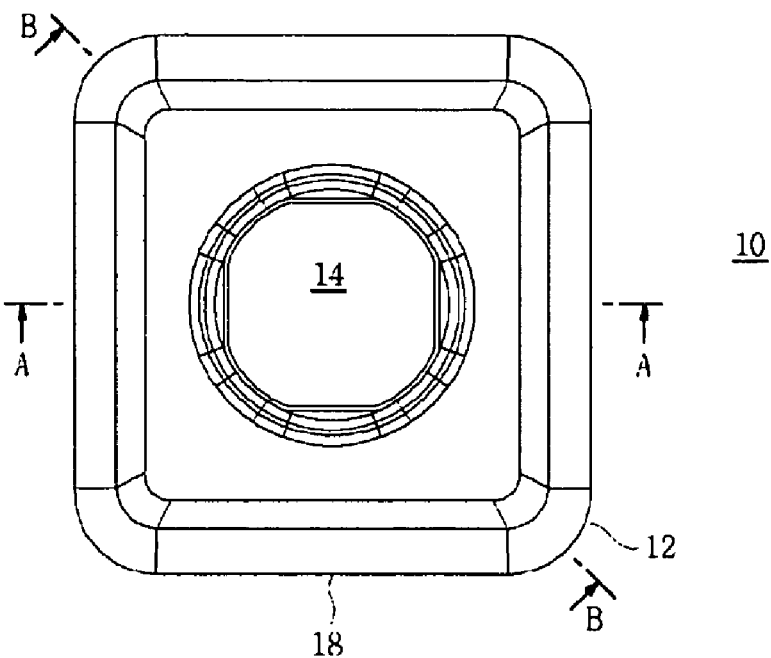
FIG. 3 is a plan view of a cutting insert for a milling cutter according to the present invention.

FIG. 3 is a plan view of a cutting insert for use with a milling cutter, which is constructed in accordance with one embodiment of the present invention. The cutting insert 10 generally has a rectangular parallel piped shape. The cutting insert is symmetrical with its central portion such that it can cut a workpiece by using cutting edges provided at each corner of its upper and lower surfaces. The central portion of the cutting insert is formed with a mounting hole 14 passing therethrough from the upper surface thereof to the lower surface thereof. On the other hand, a cutter body 40 is formed with a seating surface portion for receiving the cutting insert 10. A seating surface 46, which contacts a bottom surface of the cutting insert 10, is formed with a threaded hole 42, to which a screw 30 having passed through the mounting hole 14 of the cutting insert 10 is fastened. The threaded hole 42 is slanted with respect to the seating surface 46. A wall surface of the threaded hole is formed with a thread, which is engaged to a thread 34 of the screw 30. Accordingly, the screw 30 is fastened to the threaded hole 42 of the cutter body 40 through the mounting hole 14 of the cutting insert 10, thereby rigidly securing the cutting insert 10 to the cutter body 40.

Figure 4:
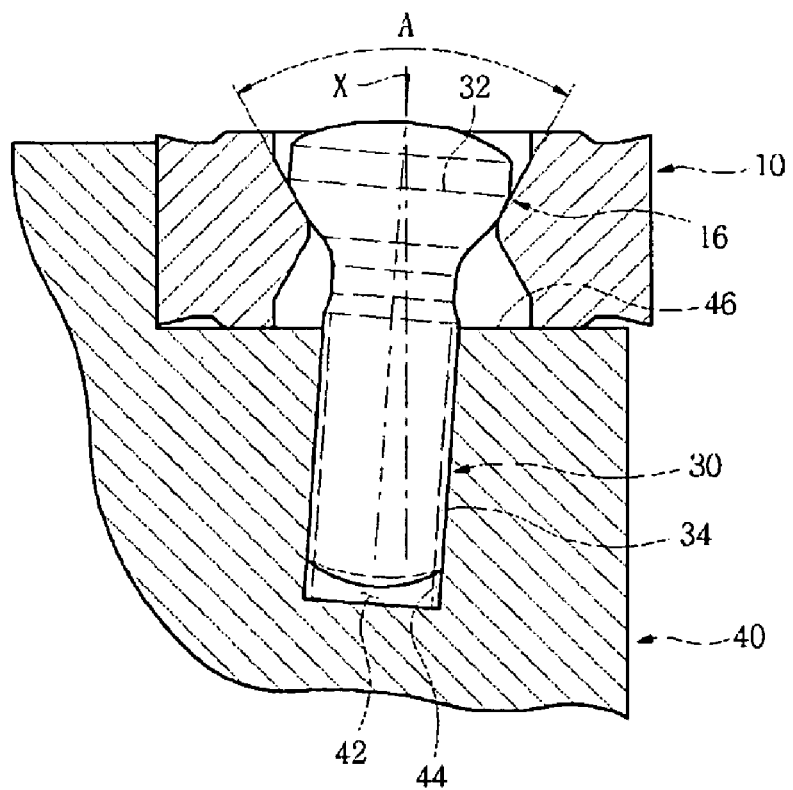
FIG. 4 is a sectional view taken along the line A-A of FIG. 3.
Figure 5:
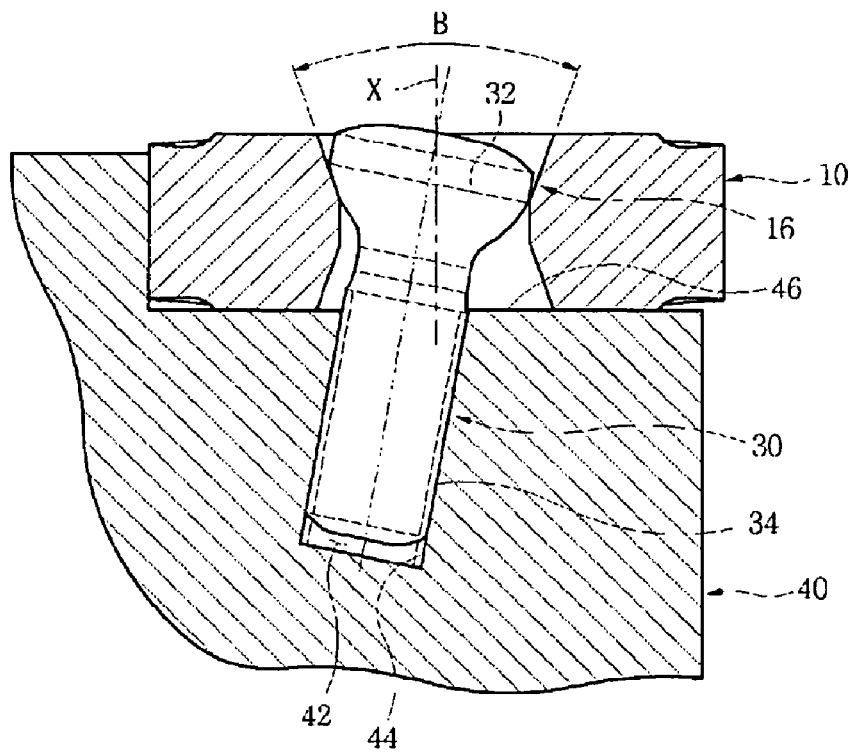
FIG. 5 is a sectional view taken along the line B-B of FIG. 3.

FIG. 4 is a sectional view taken along the line A-A of FIG. 3. FIG. 5 is a sectional view taken along the line B-B of FIG. 3. When the screw 30 is fastened to the threaded hole 42 of the cutter body 40 so as to secure the cutting insert 10, a head 32 of the screw is contacted to one portion opposed to a lateral portion 18 of the cutting insert 10 and to the other portion opposed to the corner 12 with respect to the wall surface 16 of the mounting hole 14 of the cutting insert 16 at different levels and at different contact angles, respectively. As used herein, a contact angle means an angle included between two tangent lines, which extend respectively from two contact points where the head 32 of the screw is contacted to the wall surface 16 of the mounting hole 14, as seen from a cross-section of the cutting insert 10 of FIGS. 4 and 5. FIG. 4 shows the contact between the head 32 of the screw and the wall surface 16 of the mounting hole in the portion opposed to the lateral portion 18 of the cutting insert. The contact angle A ranges from approximately 55 degrees to approximately 65 degrees (preferably approximately 60 degrees). FIG. 5 shows the contact between the head 32 of the screw and the wall surface 16 of the mounting hole in the portion opposed to the corner 12 of the cutting insert. The contact portions shown in FIG. 5 are formed at a higher location than the contact portions shown in FIG. 4. The contact angle B ranges from approximately 20 degrees to approximately 50 degrees (preferably approximately 40 degrees).

Unclamping forces were measured after fastening the screws by exerting the same clamping forces to the cutting inserts, which provide the fastened screws with contact angles of 30 degrees and 60 degrees, respectively. The results of such a measurement are shown in Table 1 below. The magnitudes of the clamping force and the unclamping force were measured by using a known method. It can be seen from Table 1 that the case of the contact angle of 30 degrees requires the unclamping force larger by approximate 27~approximate 47% than the case of the contact angle of 60 degrees when the same clamping forces are exerted.

TABLE 1

|  | Clamping Force | Unclamping Force |
|---|---|---|
| Contact Angle 30° | 390 Ncm | 370~425 Ncm |
| Contact Angle 60° | 390 Ncm | 290~325 Ncm |

As such, as the contact angle is small, screw unfastening caused by vibrations does not take place. However, there occurs a problem in that the screw is jammed in the mounting hole of the cutting insert during the unfastening of the screw. According to the above-described embodiment of the present invention, when the screw is fastened and the head 32 of the screw contacts the wall surface 16 of the mounting hole, the contact angle of approximately 60 degrees at the portion opposed to the lateral portion 18 of the cutting insert and the contact angle of approximately 40 degrees at the portion opposed to the corner 12 of the cutting insert are formed simultaneously. With such a constitution, the screw unfastening caused by the vibrations, which occurs during machining, was prevented. Further, the problem in which the screw is jammed in the mounting hole of the cutting insert during the unfastening of the screw also did not occur.

Figure 6:
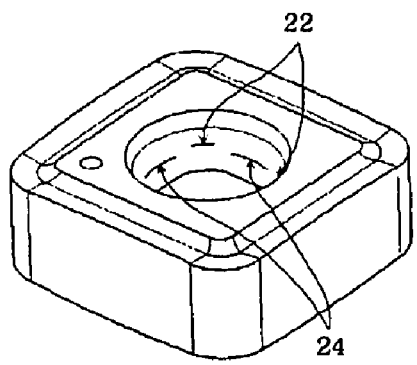
FIG. 6 is a perspective view of a cutting insert, wherein a screw is fastened and then unfastened according to one embodiment of the present invention.

FIG. 6 is a perspective view of the cutting insert, wherein the screw is fastened as shown in FIGS. 4 and 5 and the screw is thereafter unfastened. FIG. 6 shows that contact lines 22, which are formed when the head 32 of the screw is contacted to the wall surface 16 of the mounting hole opposed to the lateral portion 18 of the cutting insert 10. Further, FIG. 6 shows contact lines 24, which are formed when the head 32 of the screw is contacted to the wall surface 16 of the mounting hole opposed to the corner 12. The above contact lines are located at different levels. The contact lines 22 on the wall surface 16 of the mounting hole opposed to the lateral portion 18 of the cutting insert 10 are formed at a lower level along a longitudinal axis X of the mounting hole 14 than the contact lines 24 on the wall surface 16 of the mounting hole opposed to the corner 12. In such a case, when the screw 30 is fastened and the head 32 of the screw is contacted to the wall surface 16 of the mounting hole, the contact angle at the portions opposed to the lateral portion 18 of the cutting insert is approximately 60 degrees and the contact angle at the portions opposed to the corners 12 of the cutting insert is approximately 40 degrees.

As shown in FIG. 6, the contact lines, at which the head of the screw is contacted to the wall surface of the mounting hole, may be formed so as to be separated from each other.

Figure 7:
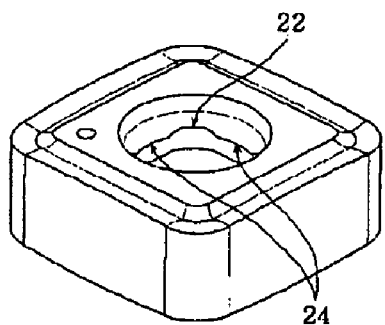
FIG. 7 is a perspective view of another cutting insert, wherein a screw is fastened and then unfastened according to one embodiment of the present invention.

On the contrary, the contact lines, at which the head of the screw is contacted to the wall surface of the mounting hole, may be joined to each other, as shown in FIG. 7. In other words, the head 32 of the screw and the mounting hole 14 are further contacted to each other at one or more contact portions. Such contact portions form a contact line, which is continuous around the periphery of the head of the screw, together with the contact portions between the head 32 of the screw and the wall surface 16 of the mounting hole in the portions opposed to the corner 12 of the cutting insert and the contact portions between the head 32 of the screw and the wall surface 16 of the mounting hole in the portions opposed to lateral portion 18 of the cutting insert. This can be accomplished by designing an appropriate geometry of the wall surface 16 of the mounting hole. Alternatively, it can be accomplished by choosing an appropriate geometry of the head 32 of the screw. As such, since the joined contact lines form longer contact lines than the separated contact lines, the head of the screw with a relatively lower hardness is less damaged when the screw is fastened under heavy loads.

The mounting hole 14 is symmetrical up and down. As shown in FIG. 3, the mounting hole is round at its entrance and is rectangular shaped with rounded corners at its middle portion. Thus, a distance between the lateral portion 18 of the cutting insert and the wall surface 16 of the mounting hole becomes increased as it proceeds to the middle portion. Accordingly, the cross-sectional area of the cutting insert is increased and the rigidity of the cutting insert is thus enhanced.

While the present invention has been described with reference to exemplary embodiments thereof, the present invention may be embodied in various manners. For example, the cutting insert of the present invention may be used not only with respect to milling cutters but also with any other cutting tools. Further, the cutting insert may have any other shape such as a trigonal prism in addition to the rectangular parallel piped shape. Those modifications will be obvious to those of ordinary skill in the art and naturally fall within the scope of the present invention.

INDUSTRIAL APPLICABILITY

As described above, according to the present invention, there are provided a cutting insert, which has a screw-contact structure allowing an unclamping force of the already fastened screw to be greatly increased, and a cutting tool comprising such a cutting insert. With such a constitution, the screw unfastening caused by the vibrations occurring during machining is prevented. Further, the problem where the screw is jammed in the mounting hole of the cutting insert during the unfastening of the screw does not also occur.

The invention claimed is:
1. A cutting tool, comprising:
   a tool body including at least one seating surface and a threaded hole extending in a direction away from the seating surface;
   at least one cutting insert removably secured on the seating surface, the at least one cutting insert having a mounting hole passing therethrough; and
   a screw passing through the mounting hole and being fastened to the threaded hole to thereby removably secure the cutting insert to the tool body;
   wherein the threaded hole is slanted with respect to the seating surface,
   wherein a wall surface of the mounting hole contacts a head of the screw about at least one first contact portion and at least one second contact portion, the at least one first contact portion being formed at a level different from that of the at least one second contact portion along a longitudinal axis of the mounting hole, a contact angle at the at least one first contact portion and a contact angle at the at least one second contact portion being different from each other.
2. The cutting tool of claim 1, wherein the at least one first contact portion provides a contact angle of approximately 60 degrees and the at least one second contact portion provides a contact angle of approximately 40 degrees.
3. The cutting tool of claim 2, wherein the at least one first contact portion is are disposed lower than the at least one second contact portion along the longitudinal axis of the mounting hole.
4. The cutting tool of any one of claims 1 to 3, wherein the wall surface of the mounting hole further contacts the head of the screw about at least one third contact portion, and wherein the at least one first contact portion, the at least one second contact portion and the at least one third contact portion form a continuous contact line around the periphery of the head of the screw.
5. The cutting tool of any one of claims 1 to 3, wherein the mounting hole is symmetrical with respect to a center portion thereof.
6. The cutting tool of claim 5, wherein the cutting insert has a rectangular parallel piped shape, and wherein the mounting hole is round at the upper and lower ends and rectangular with rounded corners in the middle portion.
7. A cutting insert having a mounting hole for a screw to pass through, the cutting insert being mounted to a tool body by the screw and providing cutting edges of the tool,
   wherein a wall surface of the mounting hole contacts a head of the screw about at least one first contact portion and at least one second contact portion, the at least one first contact portion being formed at a level different from that of the at least one second contact portion along a longitudinal axis of the mounting hole, a contact angle at the at least one first contact portion and a contact angle at the at least one second contact portion being different from each other.
8. The cutting insert of claim 7, wherein the geometry of the wall surface of the mounting hole is configured such that the at least one first contact portion provides a contact angle of approximately 60 degrees with respect to the screw and the at least one second contact portion provides a contact angle of approximately 40 degrees with respect to the screw.
9. The cutting insert of claim 8, wherein the at least one first contact portion is disposed lower than the at least one second contact portion along the longitudinal axis of the mounting hole.
10. The cutting insert of any one of claims 7 to 9, wherein the wall surface of the mounting hole further provides the screw with at least one third contact portion, and wherein the at least one first contact portion, the at least one second contact portion and the at least one third contact portion form a closed curve.
11. The cutting insert of any one of claims 7 to 9, wherein the cutting insert has a rectangular parallel piped shape, and wherein the mounting hole is symmetrical with respect to a center portion thereof and the mounting hole is round at the upper and lower ends and rectangular with rounded corners in the middle portion.

* * * * *